(12) United States Patent
Kawan (10) Patent No.: US 6,289,324 B1
(45) Date of Patent: Sep. 11, 2001

(54) SYSTEM FOR PERFORMING FINANCIAL TRANSACTIONS USING A SMART CARD

(75) Inventor: Joseph C. Kawan, Hollywood, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/477,455

(22) Filed: Jan. 4, 2000

Related U.S. Application Data

(63) Continuation of application No. 09/018,791, filed on Feb. 4, 1998, now Pat. No. 6,012,049.

(51) Int. Cl.$^7$ ............................... G06F 17/60; G07F 7/10
(52) U.S. Cl. ............................................... 705/41; 235/375
(58) Field of Search .................................. 705/41, 42, 43; 235/375, 379, 380, 381

(56) References Cited

U.S. PATENT DOCUMENTS 4,874,935  10/1989  Younger ............................... 235/379

(List continued on next page.)

FOREIGN PATENT DOCUMENTS

98/02834  *  1/1998  (WO) .............................. G06F/17/60
9918504   *  4/1999  (WO) .............................. G06F/11/00

OTHER PUBLICATIONS

"Notebook Security–IBM Smart Card" EDGE–Work-Group Computing Report–Oct. 26, 1998.*
"Phillips Semiconductors"–Nov. 10, 1998–Business Editors Technology Writers.*

Primary Examiner—Vincent Millin
Assistant Examiner—Geoffrey Akers
(74) Attorney, Agent, or Firm—George T. Marcou; Kilpatrick Stockton LLP (57) ABSTRACT

A financial information and transaction system comprising a host financial computer system, which host system maintains records of user account information; at least one terminal providing a user interface for accessing the host financial computer system, the at least one terminal including a means for transmitting and receiving data corresponding to the user account information, and a smart card interface device; wherein access to the records of user account information are organized in a hierarchy of three or more levels, which hierarchy comprises an initial level, a final level, and one or more intervening levels; wherein the records of user account information are accessed by passing through the hierarchy of three or more levels; and wherein means are provided for allowing access to the final level in the hierarchy by an automated task without passing through the one or more intervening levels is described. Further, a financial information and transaction system comprising a host financial computer system, said host system maintaining records of user account information; at least one terminal providing a user interface for accessing said host financial computer system, said at least one terminal including a means for conducting a transaction based on the user account information, a smart card interface device; and a smart card; wherein conducting said transaction based on said records of user account information is organized in a hierarchy of three or more levels, said hierarchy of three or more levels comprising an initial level, a final level, and one or more intervening levels; wherein said transaction is conducted by passing through said hierarchy of three or more levels; and wherein means are provided for allowing access to the final level in the hierarchy by an automated task without passing through said one or more intervening levels is described. These transactions include a deposit of funds; a withdrawal of funds; an exchange of currency; a transfer of funds between said user's checking account and said user's savings account; a purchase of stock; and a sale of stock.

16 Claims, 3 Drawing Sheets

U.S. PATENT DOCUMENTS

| | | | |
|---|---|---|---|
| 5,175,416 | 12/1992 | Mansvelt et al. | 235/380 |
| 5,220,501 | 6/1993 | Lawlor et al. | 379/93 |
| 5,322,989 | 6/1994 | Long et al. | 235/375 |
| 5,438,184 | 8/1995 | Roberts et al. | 327/83 |
| 5,452,357 | 9/1995 | Naccache | 713/172 |
| 5,453,601 | 9/1995 | Rosen | 235/379 |
| 5,461,217 | 10/1995 | Claus | 235/380 |
| 5,461,675 | 10/1995 | Diehl et al. | 235/380 |
| 5,473,143 | 12/1995 | Vak et al. | 235/380 |
| 5,487,135 | 1/1996 | Freeman | 706/59 |
| 5,521,966 | 5/1996 | Friedes et al. | 379/91.02 |
| 5,530,232 * | 6/1996 | Taylor | 235/380 |
| 5,555,354 | 9/1996 | Strasnick et al. | 345/427 |
| 5,559,313 | 9/1996 | Claus et al. | 705/17 |
| 5,574,270 | 11/1996 | Steffan | 235/441 |
| 5,860,063 | 1/1999 | Gorin et al. | 704/257 |
| 5,991,748 * | 11/1999 | Taskett | 705/41 |
| 6,012,049 * | 1/2000 | Kawan | 705/41 |
| 6,014,648 * | 1/2000 | Brennan | 705/41 |
| 6,018,717 * | 1/2000 | Lee et al. | 705/13 |
| 6,041,314 * | 3/2000 | Davis | 705/41 |
| 6,058,402 * | 5/2000 | Feiken | 708/144 |
| 6,064,988 * | 5/2000 | Thomas | 705/44 |

* cited by examiner

SYSTEM FOR PERFORMING FINANCIAL TRANSACTIONS USING A SMART CARD

This application is a continuation of Ser. No. 09/018,791 filed Feb. 4, 1998, U.S. Pat. No. 6,012,049.

BACKGROUND OF THE INVENTION

1. Field of the Invention

This invention generally relates to the field of smart cards for conducting financial transactions. More particularly, the present invention relates to a smart card that can acquire information regarding a customer's transactions and establish a system automated task for assisting in such financial transactions.

2. Description of Related Art

Credit cards, debit cards, and automatic teller machine cards are widely used by consumers around the world to access, transfer and spend money. These cards make use of a magnetic strip disposed on the back of the card which is encoded with information about the cardholder and the account or accounts accessed by the card. Terminals, which may be automatic teller machines (ATMs) or merchant terminals at a place of business or point of sale, are used to read the coded information on the card and access the cardholder's account to complete a financial transaction.

Besides the well known credit and debit cards, stored value cards are becoming increasingly popular. A stored value card is a card that is purchased or established for a specific monetary amount. That monetary amount is stored as the value of the card. When the cardholder desires to use the stored value card to purchase goods or services, the card is presented at the point of sale and the cost of the goods or services purchased is deducted from the value of the card.

The cardholder may continue to use the stored value card in this manner until all the value has been removed from the card. The card may then be discarded user of the care may provide a method for replenishing the value of the card. Such cards are commonly used today as a means for paying subway fare and making phone calls.

The development of such convenient financial instruments has also produced "smart cards." Rather than employing information encoded on a magnetic strip, smart cards incorporate a microprocessor which is embedded in the card and can interact with the ATM or merchant terminal to provide information about the cardholder or the cardholder's account, transaction authorization, or other information. Various smart card designs and applications are described in the following U.S. Patents which are incorporated herein by reference: U.S. Pat. Nos. 4,766,293 (Boston); U.S. Pat. No. 4,868,376 (Lessin et al.); and U.S. Pat. No. 4,874,935 (Younger).

Advanced smart cards, called very smart cards, may even include a battery, a keypad and an LCD display on the face of the card. However, due to the expense of such advanced cards, typical smart cards have no keypad or display and look like other plastic credit cards.

Smart cards can be designed to operate as stored value cards, credit cards, debit cards, ATM cards, calling cards, etc. A smart card may also be designed to perform any combination of these various functions. However, the multiplicity of capabilities offered by smart cards could result in customer frustration resulting from the vast array of choices available each time a smart card is placed in a smart card reader. For example, use of a smart card at a Citibank ATM machine might permit a customer to deposit money, to withdraw money, to exchange currency, to view a customer's balance, to transfer money between the customer's checking and savings accounts, to purchase and/or sell stocks, etc. A customer wishing to transact only a single type of transaction might encounter a series of menus offering the various financial transaction options available to the customer. A transaction, initially perceived by the consumer to be seemingly a quick and efficient exchange, becomes a test of endurance between the customer and the machine as the customer windows down the choice available by selecting an option at each of several menus.

Thus, there is a need for a smart card that offers enhanced convenience when assisting a customer in executing a transaction. There is also a need for a smart card that can acquire information regarding a consumer's transactions and establish a system automated task for carrying out such financial transactions. Such a smart card has not been available in the prior art.

SUMMARY OF THE INVENTION

Accordingly, it is an object of the present invention to meet the abovestated needs and others. It is also an object of the present invention to provide a smart card which can acquire information regarding a consumer's transactions and establish a system automated task for carrying out such financial transactions.

These objects, among others, have been obtained by means of a financial information and transaction system comprising a host financial computer system, which host system maintains records of user account information; at least one terminal providing a user interface for accessing the host financial computer system, the at least one terminal including a means for transmitting and receiving data corresponding to the user account information, and a smart card interface device; wherein access to the records of user account information are organized in a hierarchy of three or more levels, which hierarchy comprises an initial level, a final level, and one or more intervening levels; wherein the records of user account information are accessed by passing through the hierarchy of three or more levels; and wherein means are provided for allowing access to the final level in the hierarchy by an automated task without passing through the one or more intervening levels.

These objects, among others, have also been obtained by means of a financial information and transaction system comprising a host financial computer system, said host system maintaining records of user account information; at least one terminal providing a user interface for accessing said host financial computer system, said at least one terminal including a means for conducting a transaction based on the user account information, a smart card interface device; and a smart card; wherein conducting said transaction based on said records of user account information is organized in a hierarchy of three or more levels, said hierarchy of three or more levels comprising an initial level, a final level, and one or more intervening levels; wherein said transaction is conducted by passing through said hierarchy of three or more levels; and wherein means are provided for allowing access to the final level in the hierarchy by an automated task without passing through said one or more intervening levels.

These transactions can include, but are not limited to, a deposit of funds; a withdrawal of funds; an exchange of currency; a transfer of funds between said user's checking account and said user's savings account; a purchase of stock; and a sale of stock.

It will be appreciated that the means for allowing access to the final level in the hierarchy by an automated task can, in one preferred embodiment, be provided on the smart card; in another preferred embodiment, can be provided in the smart card interface device; and, in still another preferred embodiment, can be provided on the host financial computer system.

Additional objects, advantages and novel features of the invention will be set forth in the description which follows or may be learned by those skilled in the art through reading these materials or practicing the invention. The objects and advantages of the invention may be achieved through the means recited in the attached claims.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Figure 1:
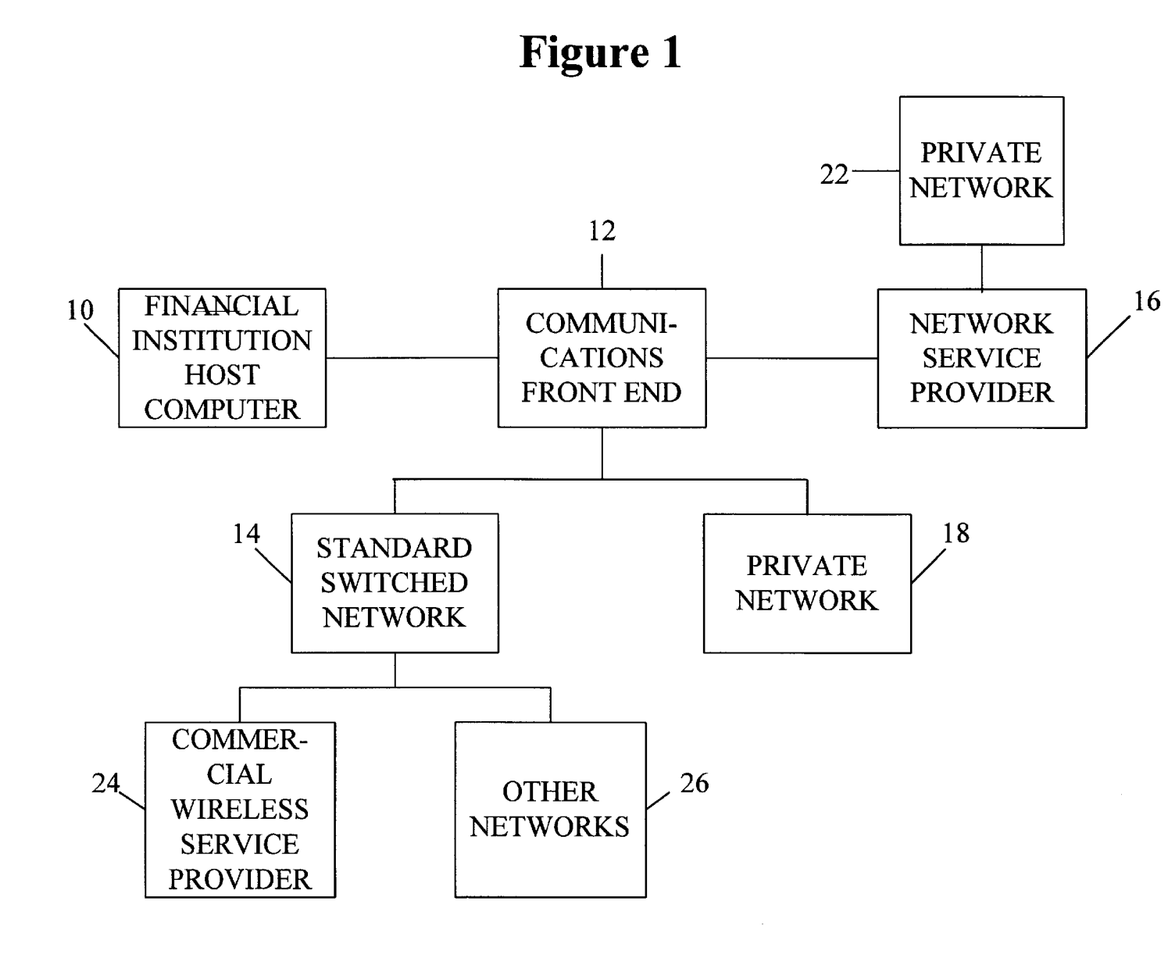
FIG. 1 is a block diagram of a financial information and transaction system in accordance with the invention.

FIG. 1 is a block diagram illustrating a system for providing financial information and performing financial transactions in accordance with the present invention. In this embodiment, a financial institution is represented by block 10. As known in the art the financial institution, such as a consumer banking institution, utilizes an automated system, including a host computer, for maintaining records of customer accounts. These records are used to keep track of funds in the customer accounts, to enter debits and credits made to such accounts, and for other purposes.

In order to provide various services to the customer, such as providing account information and account debiting and crediting at the customer's request, a communications front end 12 is used to exchange data corresponding to such information. The communication front end 12 provides access to the host computer operated by the financial institution 10 from a variety of communication systems. For example, as shown, the communications front end 12 may exchange data with a standard switch network 14, such as one operated by a regional telephone company. Thus, data transfer utilizing such a system generally takes place over the telephone line. In this way, data may be exchanged with a user suitably linked to the standard switch network 14 with a modem using any of a variety of communication protocols known in the art. Moreover, data may be exchanged in this way other financial institutions and financial networks (not shown), for example, to provide data for settlement of various customer transactions.

Alternately, the communication front end 12 may be connected to a network service provider 16 or a private network 18. For example, one of several commercial services now available may link users throughout a geographic area. Further, the communications front end 12 may provide an interface between the financial institution 10 and a private network 18 comprising, for example, one or more local area networks (LAN) or wide area networks (WAN).

As illustrated, FIG. 1 shows direct links between the communications front end 12 and the various types of communication systems 14, 16, and 18. However, it will be understood by those skilled in the art that various combinations of such systems, and others, are possible. For example, a private network 22 may be accessed with the communications front end 12 through a network service provider 16. Other networks 26, such as the so called "Internet," may be accessed with the standard switch networks 14.

The present invention comprises a financial information and transaction system comprising a host financial computer system as illustrated in FIG. 1, which host system maintains records of user account information; at least one terminal providing a user interface for accessing the host financial computer system, the at least one terminal including a means for transmitting and receiving data corresponding to the user account information, and a smart card interface device; wherein access to the records of user account information are organized in a hierarchy of three or more levels, this hierarchy comprising an initial level, a final level, and one or more intervening levels; wherein said records of user account information are accessed by passing through the hierarchy of three or more levels; and wherein means are provided for allowing access to the final level in the hierarchy by means of an automated task without passing through one or more intervening levels.

An aspect of the present invention is a smart card (e.g., a plastic credit or debit card with a microcomputer embedded in the card) which stores financial and account identification information in memory. In order to use such a card, the computer in an automatic teller machine (ATM) or in a merchant terminal at a point of sale must interface with the microcomputer in the smart card.

Figure 2:
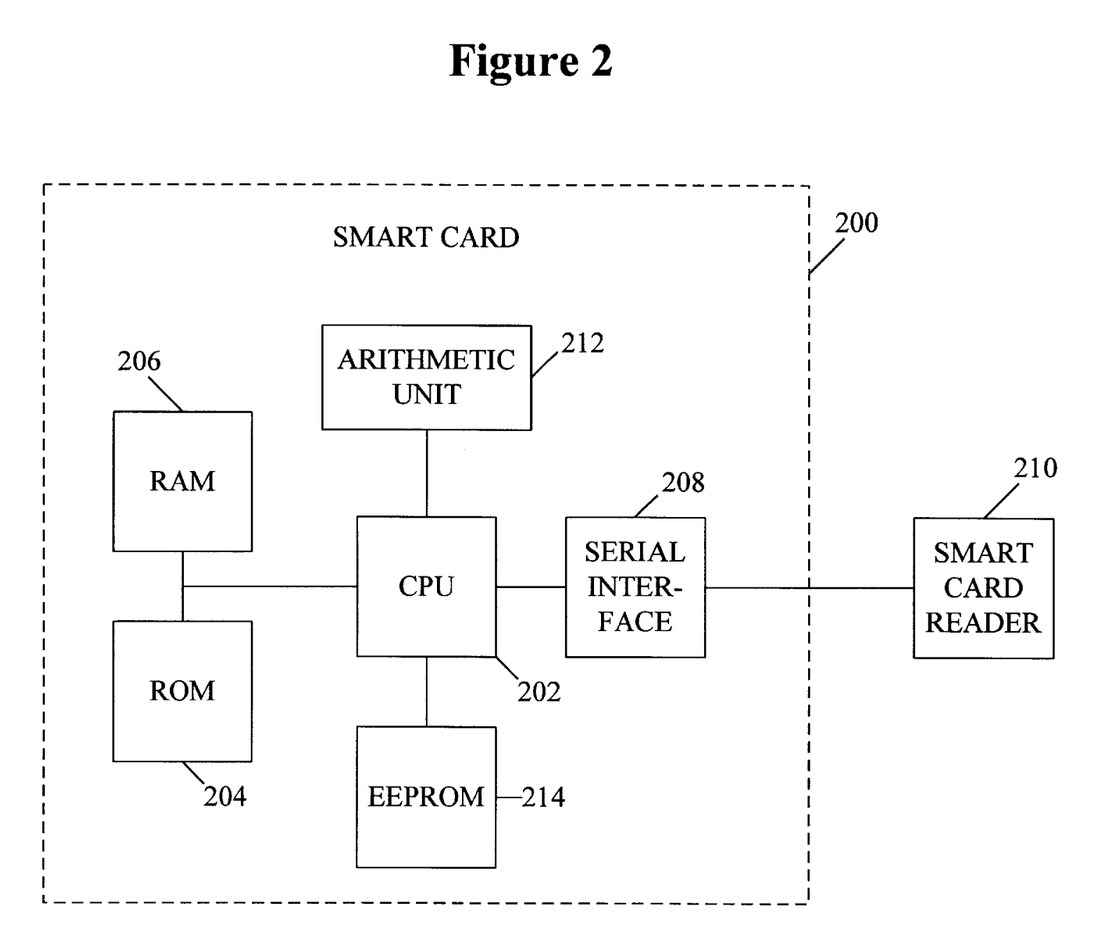
FIG. 2 is a block diagram of a smart card according to the invention.

FIG. 2 illustrates a multi-purpose smart card 200 which permits both financial and non-financial functions in an integrated system such as that described in FIG. 1. The smart card 200 comprises a central processing unit 202 (CPU) which is connected to a read only memory 204(ROM), primarily used for storage of an operating system. A random access memory 206 (RAM) is also provided for volatile storage of data, particularly for program execution. The CPU 202 is operatively coupled to a serial interface 208 which in turn communicates with a smart card reader 210 according to techniques well known in the art.

The CPU is connected to an arithmetic logic unit 212, for example, one suitable for processing large keys (512 byte keys, 1024 current RSA). An electrically erasable programmable read only memory 214 (EPROM) is provided, which typically stores system files and applications.

Figure 3:
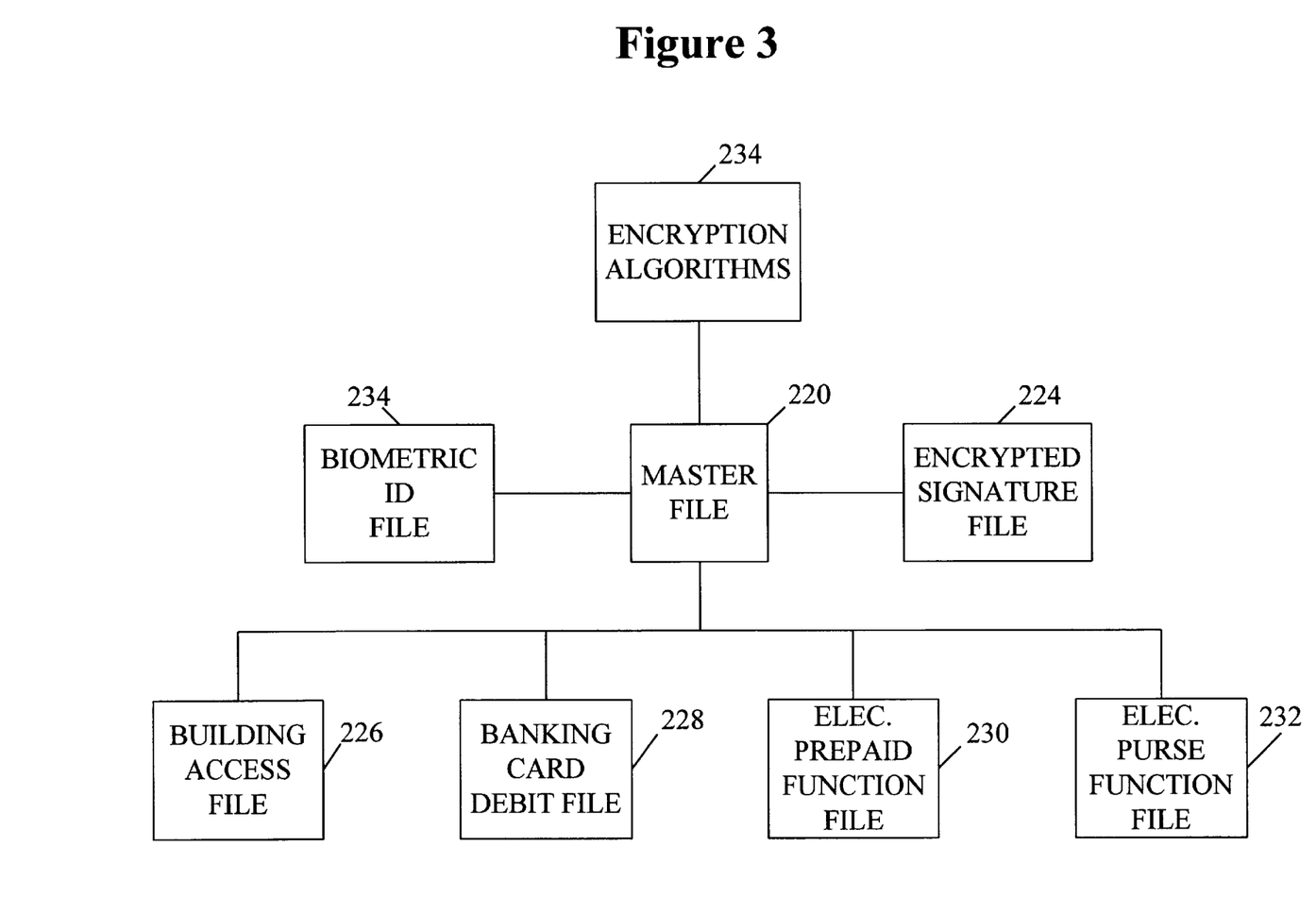
FIG. 3 is a block diagram of a file structure of the smart card of FIG. 2.

As illustrated in FIG. 3, the smart card 200 of FIG. 2 has different file paths for different functions. The EEPROM has a master file 220 and dedicated files for different applications. These dedicated files include a biometric identification file 222 and an encrypted digital signature file 224. Also included is a building access file 226 that contains information which enables the card to be used in conjunction with a security system. The master file 220 also is linked to a banking card debit file 228 which may also have its own security path for identification. The smart card has a prepaid function path 230 which can only be loaded through a secure function, and a "non-secure" electronic purse function file 232. These files are readable by an external terminal and may be decremented as required from an outside terminal.

In this example, the master file 220 also has a digital encryption capability 234 providing algorithmic computation for the processing of digital keys and encryption of, for example, the user's PIN. The algorithms used may provide symmetrical or asymmetrical encryption as known in the art.

While the smart card utilized in the invention embodies a "computer", it has a fairly limited memory. For example, the EEPROM may be limited to the range between 3 to 8 kilobytes with current technology limitations. Accordingly, the smart card in the system preferably acts as an enabling device for other systems according to known techniques. For example, the smart card provides validation of the individual and the service requested, but does not store large quantities of data on the card.

The smart card 200 of FIGS. 2 and 3 includes two storage areas for storing monetary values. The first is an "electronic purse" represented by file 232. This area is used, for example, when the user makes a high value purchase by placing the smart card in a merchant's terminal. The user accepts the transaction and amount of the purchase entered by the merchant by entering the user's PIN. The user then approves the amount, for example, by pushing an "enter" button on a terminal keypad, the card purse cash value is then debited by the requested amount, and, conversely, the merchant's account is credited that amount.

A second area for storing monetary values on the card comprises a "pre-paid account" represented by file 230. This account is generally utilized for lower value purchases, for example, fifty dollars or less. This account is kept in an unsecured cash area of the smart card and operates essentially like cash. For example, the user of the smart card may make purchases from this account without entering the user's PIN. Possible uses would include, preferably, low value, fast transactions such as at a cafeteria, or a vending machine, or when placing a local telephone call.

The smart cards referred herein interface with the system through the use of various smart card reader/processors. These processors vary in complexity and sophistication depending upon the application. For example, when used to regulate building access, the smart card may be inserted into a smart card reader which simply identifies the user. This could be used in lower security areas, such as parking garages. A numerical keypad, by which a users PIN may be entered, can be required for added security, such as at building door entrances. For even further security, some biometric parameter (such as a fingerprint) may be used for identification. This same access code with or without a PIN can be used in a smart card reader attached to a stand-alone or network personal computer to control the level of access to local or remote files, communication networks, databases and network services.

In the aforementioned embodiments, the smart card incorporates optional digital encryption signatures and encryption algorithms to enable the smart card to be validated from a remote location, such as a host computer at a financial institution or at off/on line merchant terminals equipped with a SAM module for off-line card authentication. In such instances both ends of the communication (for example, the host computer and the smart card) may each have an encryption key so that data (such as a PIN entry) which is sent via the smart card and is validated at the host computer. Thus, the host computer is able to validate that the smart card is authentic and that the proper user is using the smart card so that a financial transaction can take place.

In a wireless off-line situation, the smart card and the terminal being used similarly validate one another because there is a possibility that a false terminal is being used. Accordingly, even in an off line system, security measures are available to validate the card, the terminal, and the user.

In this invention, it is assumed that:

The financial institution has been authorized to create an application structure in a smart card, and The smart card's file structure is capable of being altered under a secure, special access control after the structure has been created.

To achieve the stated and other objects of the present invention, as embodied and described below, the invention may comprise:

an automatic teller machine; and a smart card with at least one programmable module; and the automatic teller machine recognizes the smart card as a programmable smart card.

Smart cards interfacing with automatic teller machines (ATMs) or other terminals permitting access to a financial institution can provide a customer with an array of financial information and allow the customer to perform a wide variety of financial transactions. For example, such access can include review of balances in different accounts, review of transaction journals for various accounts, performing fund transfers between different accounts, among others. These accounts can include, among others, savings accounts, checking accounts, brokerage accounts, stock portfolios, and other investment portfolios.

As conventionally organized on typical ATM or home baking systems, this array of services is supplied to the customers by means of an extensive and complex menu structure, often arranged in a hierarchy of menu screens. This hierarchical menu structure can require the customer to navigate through many layers of options to arrive at a menu screen which permits the customer to carry out his desired transaction. This can result in significant frustration on the part of the customer.

The present invention provides a system in which a customer is placed at a desired menu screen within this hierarchical menu structure without having to navigate through a large number of intervening menu screens. Thus, the system has constructed a navigational short-cut path through the menu screens. The customer, after logging onto the system (which log on procedure presumably will utilize at least one entry and/or security screen), the customer can utilize this navigational short cut path to take him or her directly to a menu screen which the customer wishes.

It will be appreciated that the present invention includes a system in which the customer can specify an option selected from a group of two or more screens to which the system will take the customer. In one embodiment of the present invention, the customer will enter a code which directs the system to execute the automated task of taking the customer past one or more screens and to a desired and pre-set screen. In another embodiment, the system displays a listing of the various navigational short-cuts, which the customer has previously chosen.

For example, if the customer wishes want to pay bills, he or she can input "PAY" and this command will take the customer to the bill payment menu. In the absence of the present system, the customer might have to go through six menus to reach the bill payment menu.

The present invention permits the customer to establish a personal navigation path that will convey the customer directly to one or more desired menu screens. The choice of the destination menu screen will reflect the transaction that the customer wishes to execute. It will be appreciated that the present invention can be employed in conjunction with ATM devices, home banking terminals, and other terminals which permit the use of smart cards in connection with obtaining financial information or in executing financial transactions, among others.

In a preferred embodiment, upon logging onto a system permitting access to a financial computer system, a customer will encounter a menu screen that asks the customer whether he/she wishes the system to create a personal navigation path for the given transaction. If the customer responds affirmatively, then the system will track the path that the customer follows in carrying out the transaction. This tracked path is then temporarily saved as a system-automated task. At the conclusion of the transaction, the customer is queried by the system if the customer wishes to save the navigational path just traversed. If the customer responds affirmatively, the system will save the navigational path as a system automated task.

In those embodiments of the present invention in which the system permits a customer to save more than one navigational short cut, the system will query the customer to identify the saved system automated task by means of a code. It will be appreciated that this code can by numeric, alphabetic, or alphanumeric. The number of characters in the code can be one or more characters, the choice of the number of characters defining a code being a function of the number of navigational shortcuts that the system permits a customer to have, as well as memory limitations of the system and the smart card.

In an alternate embodiment of the present invention, the system will automatically track the path that the customer follows in carrying out a transaction. This tracked path is then temporarily saved as a system-automated task. At the conclusion of the transaction, the customer is queried by the system if the customer wishes to save the navigational path just traversed. If the customer responds affirmatively, the system will save the navigational path as a system automated task. In those embodiments of the present invention, in which the system permits a customer to save more than one navigational short cut, the system will query the customer to identify the saved system automated task by means of a code.

In yet another embodiment of the present invention, the system will automatically track the path that the customer follows in carrying out a transaction. This tracked path is then temporarily saved as a system-automated task. After a certain threshold number of traversals of the navigational path, the system will save it a system automated task, which will be invoked each time the customer logs on. However, if the customer deviates from the navigational shortcut, the system will reset and begin again automatically tracking the path that the customer follows in carrying out a transaction.

In one preferred embodiment of the present invention, the saved system automated task is saved in EERROM memory provided on the smart card, such that the data can be saved when the smart card is removed. In another embodiment, the system will save the system automated task on a file server connected to the financial computer system.

It will be recognized that the system of the present invention is analogous, for example, to systems which allow for programming of a series of keystrokes as a "macro" in a word-processing program. Further, systems which monitor performance of a system and construct routines based on such past performance are recognized as expert systems. Examples of such systems can be found in U.S. Pat. No. 5,487,135 and U.S. Pat. No. 5,555,354, which are incorporated herein by reference.

Because the microcomputer is embedded in the smart card body, the card surface must include electrical contacts which function as a communications port to interface the microcomputer in the card with a processor in an ATM or a merchant terminal. The power, input, and display for a smart card microcomputer is thus provided by interfacing the card with an ATM or merchant terminal.

A smart card terminal must be provided with a detection mechanism to determine when a smart card has been inserted and that the card is properly positioned. To be properly positioned, the communications contacts on the card must be in contact with electrical contacts that communicate with the terminal processor.

Once the smart card is properly positioned, the terminal will provide power to the microcomputer on the card and send a reset (RST) signal to the card. The card uses the RST signal to reset itself or to initiate an internal reset function. When the card is reset, it sends the terminal an answer-to-reset (ATR) signal. The ATR signal informs the card terminal of basic information about the card so that communications between the card and the terminal can be established accordingly.

Global standards for the physical construction of smart cards have been established and widely accepted. The International Standards Organization (ISO) standard 7816-1 to -6 specifies the physical characteristics of smart cards such as the size, composition, placement of electrical contacts, the electrical interface, the method of data transmission for smart cards i.e. T=—0, T=1 etc., the interface message format and identification of applications stored in the card.

While ISO standard 7816 has largely led to uniformity in the physical construction and communication protocol of smart cards, the standard does not specify the operating system or the application programming to be used. The operating system a smart card uses is the software that tells the microcomputer on the smart card how to execute application programs. For example, the Disk Operating System (DOS) used by IBM-compatible desktop computers or System 7s used by Apples Macintosh computers are operating systems.

A smart card operating system (SCOS) is established by the manufacturer of the microcomputer embedded in the smart card. To protect it from being erased or modified, the SCOS will likely be hard-wired or masked onto the semiconductor chip of the card's microcomputer and/or partially stored in EEPROM.

The International Standard Organization has defined two standard methods for structuring information for transmission between a smart card and an ATM or merchant terminal. They are: the character mode protocol (T=0), and a block mode protocol (T=1). As part of the power up sequence, an Automatic Termination Response (ATR) message is returned from the smart card to identify the transmission protocol it supports. Both transmission protocols are widely accepted by either ATM's or merchant terminals, and some smart cards can function using either the T=0 or T=1 protocols. Based on the ATR message, the terminal and smart card can then agree on a protocol and transact.

A first principal characteristic of smart card programming is its security system. In financial applications, security is a key concern in the use of smart cards. To inspire bank, merchant and cardholder confidence in smart card technology, smart cards must be provided with security features to prevent unauthorize use of a lost or stolen card. Smart card security features must also prevent someone from fraudulently adding value to a card and from counterfeiting a card that can access a cardholder's account.

The integrated circuits (IC's) used in smart cards are physically designed for security. For example, the key electrical signal leads are placed below the top layer of the IC construction. This helps prevent a counterfeiter from probing the leads to determine the electronic addresses at which particular data is stored. Without this information, a counterfeiter cannot successfully counterfeit or compromise a smart card.

Another example of a security feature is particularly applicable to stored value cards. When functioning as stored value cards, smart cards can be programmed and re-programmed to contain a particular value as desired by the cardholder. This value is gradually depleted as purchases are made. A merchant terminal at a point of sale may be able to simply deduct value from the smart card, or the card can be designed to require the cardholder to input a personal identification number (PIN) before value may be deducted from the card.

This security feature protects the value of the card from unauthorized use if the card is lost or stolen. A smart card may have both freely-accessible value and PIN-protected value stored on it. An ATM can be provided with options that allow the cardholder to set the value of the smart card as desired.

A smart card can have the option of allowing the user to lock and unlock the electronic purse using a personal reader device equivalent in size to a small hand held calculator.

To provide a higher level of security, a smart card system can make use of security algorithms. A security algorithm is a series of mathematical functions that can be performed on a number or alphanumeric string. With a security algorithm, an ATM or a merchant terminal will perform the steps of the algorithm on a randomly generated string. This is called encryption.

The result is communicated by the ATM or merchant terminal to the smart card. The smart card then performs the steps of the algorithm in reverse order on the encrypted string provided by the ATM or merchant terminal. This is called decryption. An encryption key is a specific number or string that is used to govern the behavior of the encryption/decryption process. If the smart card has the correct algorithm and encryption key, it will generate the same string with which the ATM or merchant terminal started.

Encryption and decryption, also called ciphering and deciphering, prevent someone from counterfeiting a smart card as long as the encryption keys are known only to the issuer of the smart card and the entity supporting the ATM and merchant terminal system. If the smart card's result is the same string with which the ATM or merchant terminal started, the smart card is authenticated and the desired transaction may proceed.

Two types of encryption schemes now in use are an asymmetric encoding system and a symmetrical encoding system In a symmetrical encoding system, both encipher and decipher use an identical key. In order to maintain the security for the whole system, this key must be kept secret. Several symmetrical encoding system which have been adopted by the industry are entitled the Data Encryption Standard (DES) and the RC4/RC5 algorithm proposed by RSA. The DES algorithm has been used longer than any other algorithm and has been more widely accepted by the world-wide financial industry. Every card and each terminal used in the system must have the correct key established to reach the correct result and be authenticated when challenged. To be successful, a counterfeiter must determine the correct key. Aided with a limited number or retrials, the level of security is raised.

An asymmetrical encoding system uses a pair of keys to cipher/decipher respectively. Knowledge of one key does not aid in the derivation of the other key. This encoding algorithm allows the sender to publish one key (public key) and keep the other key (private) secret without compromising the system's security. Therefore, the asymmetrical encoding system is also called the public key cryptography (PKC) system.

In an asymmetrical encoding system, both a public and private key are used with the security algorithm. The private key is specific to each cardholder's account and will be known only by the ATM or merchant terminal and the cardholder's smart card. By keeping this key secret, the counterfeiter will have problems penetrating the system.

In addition, different public and private keys can be established for when the smart card is being used as a credit card, a stored value card, a debit card, etc. Though effective, such security measures increase the cost of the smart card in proportion to the level of security provided.

Additionally, messages transmitting information or instructions between a smart card and a terminal may be encrypted by the sender and decrypted by the receiver to prevent a counterfeiter from tapping into the communication between an authentic card and an authorized terminal to make illicit use of the interaction.

Another principal characteristic of a smart card application program is the set of access conditions. A computerized system, such as smart cards and card terminals, must have a system which allows the card or the card terminal to read and write data in memory when doing so is appropriate. The application programming on the smart card or the application program being run by the terminal tells the components of the system when to read and write data and allows reading/writing under the established access conditions.

Still another characteristic of a smart card application program is its data structure. The data structure is the set of rules an application program uses to determine where in the memory of the smart card particular data or types of data will be stored.

Obviously, numerous modifications and variations of the present invention are possible in light of the above teachings. It is therefore to be understood that within the scope of the appended claims, the invention may be practiced otherwise than as specifically described herein.

What is claimed is:

1. A financial information and transaction system comprising:

a host financial computer system, said host system maintaining records of user account information;

at least one terminal providing a user interface for accessing said host financial computer system, said at least one terminal including a means for transmitting and receiving data corresponding to the user account information, a smart card interface device;

and a smart card;

wherein access to said records of user account information are organized in a hierarchy of three or more levels, said hierarchy of three or more levels comprising an initial level, a final level, and one or more intervening levels;

wherein said records of user account information are accessed by passing through said hierarchy of three or more levels; and wherein means are provided for allowing access to the final level in the hierarchy by an automated task without passing through said one or more intervening levels.

2. The system according to claim 1, wherein said means for allowing access to the final level in the hierarchy by an automated task is provided on the smart card.

3. The system according to claim 1, wherein said means for allowing access to the final level in the hierarchy by an automated task is provided in the smart card interface device.

4. The system according to claim 1, wherein said means for allowing access to the final level in the hierarchy by an automated task is provided on the host financial computer system.

5. The system according to claim 1, wherein said records of user account information comprises checking account balance.

6. The system according to claim 1, wherein said records of user account information comprises savings account balance.

7. A financial information and transaction system comprising:
- a host financial computer system, said host system maintaining records of user account information;
- at least one terminal providing a user interface for accessing said host financial computer system, said at least one terminal including a means for conducting a transaction based on the user account information,
- a smart card interface device;
- and a smart card;
- wherein conducting said transaction based on said records of user account information is organized in a hierarchy of three or more levels, said hierarchy of three or more levels comprising an initial level, a final level, and one or more intervening levels;
- wherein said transaction is conducted by passing through said hierarchy of three or more levels; and
- wherein means are provided for allowing access to the final level in the hierarchy by an automated task without passing through said one or more intervening levels.

8. The system according to claim 7, wherein said means for allowing access to the final level in the hierarchy by an automated task is provided on the smart card.

9. The system according to claim 7, wherein said means for allowing access to the final level in the hierarchy by an automated task is provided in the smart card interface device.

10. The system according to claim 7, wherein said means for allowing access to the final level in the hierarchy by an automated task is provided on the host financial computer system.

11. The system according to claim 7, wherein said transaction comprises a deposit of funds.

12. The system according to claim 7, wherein said transaction comprises a withdrawal of funds.

13. The system according to claim 7, wherein said transaction comprises an exchange of currency.

14. The system according to claim 7, wherein said transaction comprises a transfer of funds between said user's checking account and said user's savings account.

15. The system according to claim 7, wherein said transaction comprises a purchase of stock.

16. The system according to claim 7, wherein said transaction comprises a sale of stock.

* * * * *